(12) United States Patent
Monzani et al.

(10) Patent No.: US 11,898,006 B2
(45) Date of Patent: Feb. 13, 2024

(54) PROCESS FOR THE MANUFACTURE OF POLYETHER POLYMERS

(71) Applicant: SOLVAY SPECIALTY POLYMERS ITALY S.P.A., Bollate (IT)

(72) Inventors: Cristiano Monzani, Trezzo sull'Adda (IT); Marco Galimberti, Bollate (IT); Vito Tortelli, Milan (IT)

(73) Assignee: SOLVAY SPECIALTY POLYMERS ITALY S.P.A, Bollate (IT)

( * ) Notice: Subject to any disclaimer, the term of this patent is extended or adjusted under 35 U.S.C. 154(b) by 786 days.

(21) Appl. No.: 17/048,683

(22) PCT Filed: Apr. 18, 2019

(86) PCT No.: PCT/EP2019/060080
§ 371 (c)(1),
(2) Date: Oct. 19, 2020

(87) PCT Pub. No.: WO2019/202076
PCT Pub. Date: Oct. 24, 2019

(65) Prior Publication Data
US 2021/0238345 A1    Aug. 5, 2021

(30) Foreign Application Priority Data
Apr. 20, 2018 (EP) .................... 18168487

(51) Int. Cl.
*C08G 65/00* (2006.01)
(52) U.S. Cl.
CPC ....... *C08G 65/007* (2013.01); *C08G 2650/48* (2013.01); *C08G 2650/50* (2013.01); *C08G 2650/64* (2013.01)
(58) Field of Classification Search
CPC ... C08G 65/3236; C08G 65/007; C08L 71/00; C08L 71/02; C08L 2205/02
See application file for complete search history.

(56) References Cited

U.S. PATENT DOCUMENTS

| 3,810,874 A * | 5/1974 | Mitsch et al. ........ C07C 265/00 564/243 |
| 5,185,421 A | 2/1993 | Cohen et al. |
| 2016/0137947 A1 | 5/2016 | Sobe et al. |

FOREIGN PATENT DOCUMENTS

| EP | 3059265 A1 | 8/2016 |
| WO | 2019101771 A1 | 5/2019 |
| WO | 2019101827 A1 | 5/2019 |
| WO | 2019202079 A1 | 10/2019 |
| WO | 2019243403 A1 | 12/2019 |
| WO | 2019243404 A1 | 12/2019 |

OTHER PUBLICATIONS

U.S. Appl. No. 16/762,912, filed May 8, 2020.
U.S. Appl. No. 16/762,914, filed May 8, 2020.
Feiring A.E., "Synthesis of New Fluoropolymers: Tailoring Macromolecular Properties with Fluorinated Substituents", Part A: Pure and Applied Chemistry, Journal of Macromolecular Science, Part A: Pure and Applied Chemistry, 1994, vol. A31, No. 11, pp. 1657-1673. Marcel Dekker, Inc.
Yang S. et al., "Novel fluorine-containing anionic aqueous polyurethanes", Journal of Macromolecular Science, Part A: Pure and Applied Chemistry, 1993, vol. 30, No. 2-3, pp. 241-252. Marcel Dekker, Inc.

* cited by examiner

*Primary Examiner* — Shane Fang
(74) *Attorney, Agent, or Firm* — Osha Bergman Watanabe & Burton LLP

(57) ABSTRACT

The present invention relates to a method for the synthesis of certain perfluoropolyether polymers having well-defined recurring units structure, and whereas the fraction of reactive end groups can be easily tuned.

14 Claims, No Drawings

PROCESS FOR THE MANUFACTURE OF POLYETHER POLYMERS

CROSS REFERENCE TO RELATED APPLICATIONS

This application is a U.S. national stage entry under 35 U.S.C. § 371 of International Application No. PCT/EP2019/060080 filed Apr. 18, 2019, which claims priority from European application No. 18168487.9, filed on Apr. 20, 2018. The entire contents of these applications are explicitly incorporated herein by this reference.

Technical Field

The present invention relates to a method for the synthesis of certain perfluoropolyether polymers possessing a well-defined recurring units structure, whereas the fraction of reactive end groups can be easily tuned.

Background Art

Among fluorinated polymers, (per)fluoropolyether polymers (PFPEs) are well-known and of great interest for their chemical and physical properties, which make them particularly interesting as lubricants.

Several syntheses of PFPEs polymers have been disclosed in the art. The first synthesis of unspecified perfluorinated polyether mixtures was reported in 1953, when an oily product was obtained in the course of photoligomerization of hexafluoropropene. Since then, a number of different perfluorinated polyethers have been synthesized and described in literature.

For example, the catalytic polymerization of perfluoroepoxides, such as notably hexafluoropropylene oxide (HFPO), firstly disclosed by Du Pont researchers, led to a product commercially available under the trade name Krytox®, which has a backbone comprising recurring units of formula $-[CF(CF_3)CF_2O]_y-$. Then, Montedison researchers disclosed the photochemical oxidation of perfluoroolefins, such as tetrafluoroethylene and hexafluoropropene, which led to a product commercially available under the trade name Fomblin®, which has a backbone comprising randomly distributed recurring units of formula $-[(CF_2O)_m(CF_2CF(R)O)_n]-$ wherein R if —F or —$CF_3$. Another synthesis, which involved the ring opening polymerisation of partially fluorinated oxetanes followed by fluorination, was disclosed by Daikin Company and led to a product commercially available under the trade name Demnum®, which has a backbone comprising recurring units of formula $-(CF_2CF_2CF_2O)_p-$.

The main difference between the (per)fluoropolyether polymers known in the art resides in the fact that Krytox® polymers and Demnum® polymers are homopolymers characterized by an ordered structure, which comprises only one type of recurring unit, i.e. $-[CF(CF_3)CF_2O]_y-$ and $-(CF_2CF_2CF_2O)_p-$, respectively. Differently, Fomblin® polymers are copolymers characterized by the presence of two or more recurring units having a different formula and being randomly (or statistically) distributed along the backbone chain. This random (or statistical) distribution of the recurring units is due to the manufacturing process, that is based on photochemical oxidation. However, the random distribution of the recurring units could led to a backbone chain comprising multiple consecutive recurring units having one carbon atoms (i.e., of formula —$CF_2O$—), which on the one hand increase the flexibility of the polymer backbone but on the other hand constitute a weak point in the polymer backbone, as they are more easily attacked by metals and/or Lewis acids. The polymerization of fluorinated vinyl ether alcohols, followed by fluorination of the intermediate partially-fluorinated structure, was disclosed by FEIRING, Andrew E. Synthesis of New Fluoropolymers: Tailoring Macromolecular Properties with FLuorinated Substituents. *Journal of Macromolecular Science*. 1994, vol.A31, no.11, p.1657-1673. However, the first approach described in this article starts from a partially fluorinated compound bearing within the same molecule both the hydroxy group and vinyl ether group (i.e., $CF_2=CFOCF_2CF(CF_3)OCF_2CF_2CH_2OH$), such that final polymer has a backbone comprising only one recurring unit of formula $-(CF_2CF_2OCF_2CF(CF_3)OCF_2CF_2O)_n-$. Another approach described in this article comprises the reaction between the compound mentioned above of formula $CF_2=CFOCF_2CF(CF_3)OCF_2CF_2CH_2OH$ and a partially fluorinated diol (for example of formula $HOCH_2(CF_2)_3CH_2OH$) to provide telechelic macrodiols to be used for the production of further copolymers, such as for example those described in U.S. Pat. No. 5,185,421 (E.I. DU PONT DE NEMOURS AND COMPANY) and by YANG, S., et al. Novel fluorine-containing anionic aqueous polyurethane. *Journal of Macromolecular Science*. 1993, vol.30, p.241-252.

Fluorinated polyether compounds have been also disclosed in US 2016/0137947 (ASAHI GLASS COMPANY, LIMITED). This patent application in particular discloses fluorinated polyether compounds represented by the following formula:

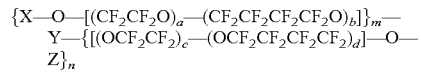

wherein
m is from 1 to 10;
n is from 0 to 10;
X is a group having a hydroxy group, a carboxy group, an ester group or an aryl group;
Y is an (m+n) valent alkane group, an (m+n) valent alkane group having an etheric oxygen atom inserted between carbon-carbon atoms, an (m+n) valent fluoroalkane group, an (m+n) valent fluoroalkane group having an etheric oxygen atom inserted between carbon-carbon atoms, or a cyclotriphosphazene structure ($P_3N_3$); and
Z is a group not having a hydroxy group, a carboxy group, an ester group or an aryl group, and having a haloalkyl group (provided that the halogen atom is a fluorine atom or a chlorine atom) or a haloalkyl group (provided that the halogen atom is a fluorine atom or a chlorine atom) having an etheric oxygen inserted between carbon-carbon atoms. In the moiety $-[(CF_2CF_2O)_a-(CF_2CF_2CF_2CF_2O)_b]-$ the linking order of "a" number of units ($CF_2CF_2O$) and "b" number of units ($CF_2CF_2CF_2CF_2O$) is not limited, i.e. units ($CF_2CF_2O$) and ($CF_2CF_2CF_2CF_2O$) may be randomly located, alternately arranged or at least one block consisting of a plurality of units ($CF_2CF_2O$) and units ($CF_2CF_2CF_2CF_2O$) may be linked. Structures having the following formula are preferred:

wherein e is from 1 to 99.

SUMMARY OF INVENTION

The Applicant faced the problem of preparing perfluoropolyether polymers having a pre-defined chemical structure, i.e. perfluoropolyether polymers characterized by recurring units which distribution in the polymer backbone is non-random but defined a priori, and wherein the nature of chain ends can be appropriately tuned among carboxylic reactive groups (also referred to as "functional groups") and perfluorinated, non-reactive group.

Thus, in a first aspect, the present invention relates to a method for manufacturing a mixture of polymers [mixture ($P^{FF}_{COOH-CF3}$)], said mixture ($P^{FF}_{COOH-CF3}$) comprising polymers possessing a backbone consisting of a sequence of recurring units of formula —O—$CF_2$—$R_F$—$CF_2$—O—$CF_2CF_2$—$(CR_f^1R_f^2)_a$—O—$R_f$—O—$(CR_f^1R_f^2)_b$—$CF_2CF_2$—,
wherein:
$R_f$ is a $C_1$-$C_{18}$ perfluorocarbon group, possibly comprising one or more than one ethereal oxygen;
$R_F$ is a bond or a $C_1$-$C_{18}$ perfluorocarbon group, possibly comprising one or more than one ethereal oxygen;
each or $R_f^1$ and $R_f^2$, equal to or different from each other, is F or a $C_1$-$C_6$ perfluorocarbon group;
a and b being independently zero or 1, preferably being equal to each other, and being collectively zero or 1;
and said polymers having chain ends selected from the group consisting of —COOH and —$CX_F^1X_F^2$F, with $X_F^1$ and $X_F^2$ being F or a $C_1$-$C_3$ perfluoroalkyl group;
said process comprising:
Step (1): a step of reacting:
(1a) at least one perfluoro compound [compound (F)] of formula $CF_2$=CF—$(CR_f^1R_f^2)_a$—O—$R_f$—O—$(CR_f^1R_f^2)_b$—CF=$CF_2$,
wherein $R_f$, $R_f^1$, $R_f^2$, a and b have the meaning defined above; and (1b) at least one hydrogen-containing compound [compound (H)] of formula: HO—$CH_2$—$R_H$—$CH_2$—OH,
with $R_H$ being a bond or a $C_1$-$C_{18}$ (fluoro)hydrocarbon group, possibly comprising one or more than one ethereal oxygen,
in molar ratio compound (H):compound (F) of exceeding 1:1, so as to generate a mixture ($p^{FH}_{OH-OH}$) comprising a major amount of any di-hydroxy compounds of formula (I):
HO—$CH_2$—$R_H$—[$CH_2$—O—$CF_2$CHF—$(CR_f^1R_f^2)_a$—O—$R_f$—O—$(CR_f^1R_f^2)_b$—CHF$CF_2$—O—$CH_2$—$R_H$]$_n$—$CH_2$—OH; and possibly comprising a minor amount of any compounds of formula (II):

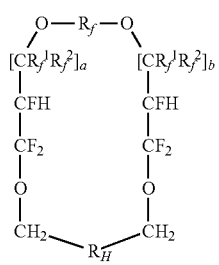

wherein in formulae (I) and (II) $R_H$, $R_f$, $R_f^1$, $R_f^2$, a and b have the meaning defined above, and n is such that the number averaged molecular weight of compounds (I) is of 300 to 50 000, preferably of 400 to 40 000, more preferably of 500 to 25 000;

Step (2): a step of reacting mixture ($p^{FH}_{OH-OH}$) with $COF_2$, so as to generate a mixture ($P^{FH}_{OC(O)F-OC(O)F}$) comprising a major amount of any di-fluoroformate compounds of formula (III):
F—C(O)—O—$CH_2$—$R_H$—[$CH_2$—O—$CF_2$CHF—$(CR_f^1R_f^2)_a$—O—$R_f$—O—$(CR_f^1R_f^2)_b$—CHF$CF_2$—O—

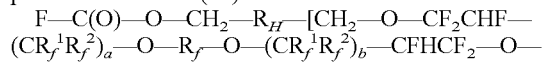

$CH_2$—$R_H$]$_{n'}$—$CH_2$—O—C(O)—F; and possibly comprising a minor amount of a compound of formula (II), as above detailed, wherein, in formula (III), $R_H$, $R_f$, $R_f^1$, $R_f^2$, a and b have the meaning defined above, and n' is such that the number averaged molecular weight of compounds (I) is of 300 to 50 000, preferably of 400 to 40 000, more preferably of 500 to 25 000;

Step (3): a step of fluorinating mixture ($P^{FH}_{OC(O)F-OC(O)F}$) with a source of molecular fluorine, so as to generate a mixture ($P^{FF}_{OC(O)F-OC(O)F}$) comprising a major amount of a perfluorinated di-fluoroformate compound of formula (IV):

F—C(O)—O—$CF_2$—$R_F$—[—$CF_2$—O—$CF_2CF_2$—

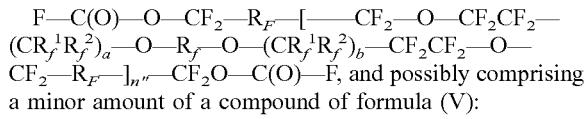

$(CR_f^1R_f^2)_a$—O—$R_f$—O—$(CR_f^1R_f^2)_b$—$CF_2CF_2$—O—$CF_2$—$R_F$]$_{n''}$—$CF_2$O—C(O)—F, and possibly comprising a minor amount of a compound of formula (V):

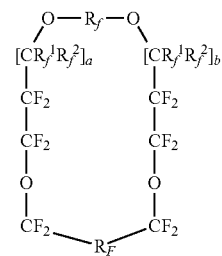

wherein in formulae (IV) and (V) $R_F$, $R_f$, $R_f^1$, $R_f^2$, a and b have the meaning defined above; and n" is such that the number averaged molecular weight of compounds (I) is of 300 to 50 000, preferably of 400 to 40 000, more preferably of 500 to 25 000;

Step (4): a step of hydrolysing mixture ($P^{FF}_{OC(O)F-OC(O)F}$) in the presence of water, so as to generate a mixture ($P^{FF}_{COOH-COOH}$) comprising a major amount of a perfluorinated di-carboxylic acid compound of formula (VII): HOOC—$R_F$—[—$CF_2$—O—$CF_2CF_2$—$(CR_f^1R_f^2)_a$—O—$R_f$—O—$(CR_f^1R_f^2)_b$—$CF_2CF_2$—O—

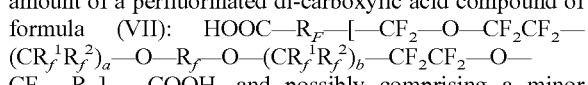

$CF_2$—$R_F$]$_{n'''}$—COOH, and possibly comprising a minor amount of a compound of formula (V), as detailed above, wherein in formula (VII) $R_F$, $R_f$, $R_f^1$, $R_f^2$, a and b have the meaning defined above, and n''' is such that the number averaged molecular weight of compounds (I) is of 300 to 50 000, preferably of 400 to 40 000, more preferably of 500 to 25 000;

Step (5): a step of fluorinating mixture ($P^{FF}_{COOH-COOH}$), by contacting with a source of molecular fluorine, wherein the required amount of fluorine to convert the targeted fraction of —COOH end groups to generate the mixture ($P^{FF}_{COOH-CF3}$), as detailed above, is added.

The Applicant has surprisingly found that through the multi-step sequence detailed above, it is possible to generate perfluoropolyether compounds having a well-organized and structured sequence of recurring units, whereas the molar fraction of reactive carboxylic acid and perfluorinated non-reactive end groups can be tuned within a wide range by the simple metering of fluorine in fluorination Step (5) as detailed above, while all other Steps can be easily adjusted to substantially quantitative yields, so as to ensure targeting final properties of the target mixture, with no significant purification/burdensome separation step.

DESCRIPTION OF EMBODIMENTS

For the purpose of the present description and of the following claims:

- the use of parentheses around symbols or numbers identifying the formulae, for example in expressions like "mixture $(P^{FF}_{COOH-COOH})$", etc., has the mere purpose of better distinguishing the symbol or number from the rest of the text and, hence, said parenthesis can also be omitted;
- the term "perfluoropolyether" is intended to indicate polyether polymer(s) comprising a fully fluorinated backbone.

As said, in Step (1), at least compound (F) and at least one compound (H) are reacted.

In said compound (F), generally $R_f^1$ and $R_f^2$ are equal to each other, and a and b are equal to each other, so that the structure of compound (F) is such to provide a sequence of identical recurring units. Further, in said compound (F), preferably, each of $R_f^1$ and $R_f^2$ are preferably F, that is to say that compound (F) preferably complies with the following formula:

$$CF_2=CF(CF_2)_aOR_fO(CF_2)_bCF=CF_2$$

wherein $R_f$, a and b have the meaning defined above. As said, preferably a and b are equal; in particular, each of a and b may be 1, which does mean that compound (F) may comprise perfluoroallyl groups, or may be zero, which does mean that compound (F) may comprise perfluorovinyl grouups.

Preferred compounds are those wherein both a and b are zero. Preferably, $R_f$ is a $C_1$-$C_{18}$ perfluoro(oxy)alkylene group, that is to say, a $C_1$-$C_{18}$ perfluoroalkylene group, possibly comprising one or more than one ethereal oxygen.

Preferred compounds (F) are those complying with the following formulae (F-I) to (F-VIII):

$$CF_2=CFO(CF_2)_2OCF=CF_2 \quad (F\text{-}I)$$

$$CF_2=CFO(CF_2)_3OCF=CF_2 \quad (F\text{-}II)$$

$$CF_2=CFO(CF_2)_4OCF=CF_2 \quad (F\text{-}III)$$

$$CF_2=CFCF_2O(CF_2)_4OCF_2CF=CF_2 \quad (F\text{-}IV)$$

$$CF_2=CFO-CF_2-(CF_2)_2O(CF_2)_2O-CF_2O-CF=CF_2 \quad (F\text{-}V)$$

$$CF_2=CFO-CF_2O-(CF_2)_2O-CF_2O-CF=CF_2 \quad (F\text{-}VI)$$

$$CF_2=CFO-CF_2O-(CF_2)_3O-CF_2O-CF=CF_2 \quad (F\text{-}VII)$$

$$CF_2=CFO-CF_2O-(CF_2)_4O-CF_2O-CF=CF_2 \quad (F\text{-}VIII)$$

Among compounds (F) above, those complying with formulae (F-II) to (F-III) have been found particularly advantageous in the method of the present invention.

As said, compound (H) complies with the following formula:

formula: $HO-CH_2-RH-CH_2-OH$, with $R_H$ being a bond or a $C_1$-$C_{18}$ (fluoro)hydrocarbon group, possibly comprising one or more than one ethereal oxygen. It is hence understood that compound (H) may comprise fluorine atoms in its group $R_H$. This being said, embodiments wherein $R_H$ is a bond or is a fluorine-free $C_1$-$C_{18}$ hydrocarbon group, possibly comprising one or more ethereal oxygen are preferred.

According to specially preferred embodiments, RH is a bond or a $C_1$-$C_{18}$ (oxy)alkylene chain; said alkylene chain may be linear or branched, with linear structures being preferred.

Most preferred compounds (H) are those complying with formulae (H-I) to (H-V):

$$HO(CH_2)_2OH \quad (H\text{-}I)$$

$$HO(CH_2)_3OH \quad (H\text{-}II)$$

$$HO(CH_2)_4OH \quad (H\text{-}III)$$

$$HO(CH_2)_5OH \quad (H\text{-}IV)$$

$$HO-CH_2CH_2OCH_2CH_2OH \quad (H\text{-}V)$$

$$HO(CH_2)_6OH \quad (H\text{-}VI)$$

Preferably, the molar ratio between said compound (H) and said compound (F) is from 1.002:1 to 30:1, preferably from 1.005 to 25:1, most preferably of 1.008:1 to 20:1.

According to certain embodiments, said step (1) optionally comprises adding, to said compound (F) and to said compound (H), one or more compound [compound (F-mono)] comprising one unsaturated group selected from vinyl group and allyl group, and/or one hydrogen-containing compound [compound (H-mono)] comprising one hydroxyl group.

Said compound (F-mono) may be selected from those of formula:

$$CF_3OCF=CF_2, C_2F_5OCF=CF_2, C_3F_7OCF=CF_2,$$
$$CF_3OCF_2OCF=CF_2, CF_3CF=CF_2, CF_2=CF_2$$
$$(TFE).$$

Said compound (H-mono) may be selected from those of formula: $CH_3OH$, $C_2H_5OH$, $C_3H_7OH$, $CF_3CH_2OH$, $(CF_3)_2CHOH$ and $(CH_3)_2CHOH$.

Nevertheless embodiments whereas no compound (F-mono) and/or no compound (H-mono) are used are preferred.

Preferably, step (1) is performed under heating, such as for example at a temperature of from 25° C. to 180° C., preferably from 30° C. to 80° C.

Preferably, step (1) is performed in the presence of a base. Suitable bases are selected in the group comprising NaOH, KOH, $NH_4OH$, NaH, trialkylamines, guanidines such as notably tetramethyl guanidine, and 1,4-diazabicyclo[2.2.2] octane ("DABCO").

Optionally, step (1) may be performed in the presence of a solvent, said solvent being preferably selected in the group comprising, more preferably consisting of, at least one polar aprotic solvent or at least one hydrofluoroether (HFE).

Preferably, said polar aprotic solvent is selected in the group comprising, more preferably consisting of, dimethoxyethane (glyme), bis(2-methoxyethyl) ether (di-glyme), triethylene glycol dimethyl ether (tri-glyme), tetraethylene glycol dimethyl ether (tetraglyme), tetrahydrofuran, acetonitrile, dimethyl sulfoxide, dimethylformamide, ethylene polyoxides dimethylethers. Acetonitrile being particularly preferred.

Step (1) is preferably performed by adding said compound (F) to said compound (H), although embodiments whereas a reverse addition order is performed maybe equally effective.

Reactivity of compound (F) in Step (1) is advantageously monitored by a suitable analytical technique enabling determining disappearance of C=C unsaturation; NMR may be used, although other technique could be equally effective for determining conditions whereas conversion of compound (F) is substantially quantitative, that is to say that no residual C=C carbon bond is detected when submitting mixture ($P^{FH}_{OH-OH}$) to such analytical determination.

As said, mixture ($P^{FH}_{OH-OH}$) comprises a major amount of a di-hydroxy compound of formula (I): HO—CH$_2$—R$_H$—[CH$_2$—O—CF$_2$CHF—(CR$_f^1$R$_f^2$)$_a$—O—R$_f$—O—(CR$_f^1$R$_f^2$)$_b$—CFHCF$_2$—O—CH$_2$—R$_H$—]$_n$—CH$_2$—OH; and possibly comprises a minor amount of a compound of formula (II):

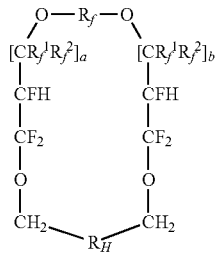

wherein in formulae (I) and (II) R$_H$, R$_f$, R$_f^1$, R$_f^2$, a and b have the meaning defined above.

Generally, mixture ($P^{FH}_{OH-OH}$) essentially consists of compounds of formula (I) and optionally (II) as detailed above, that is to say that no significant other component can be detected in said mixture.

Advantageously, mixture ($P^{FH}_{OH-OH}$) comprises an amount of compounds of formula (I) of at least 75, preferably at least 80, more preferably at least 85% moles, with respect to the total moles of compounds of formula (I) and formula (II).

Conversely, mixture ($P^{FH}_{OH-OH}$) comprises an amount of compounds of formula (I) of 100, preferably at most 99, more preferably at most 98% moles, with respect to the total moles of compounds of formula (I) and formula (II).

In compounds (I) and (II), all the preferences set forth for groups RH, Rf, R$_f^1$, R$_f^2$, a and b in connection with compounds (F) and compounds (H) are applicable here mutatis mutandis.

Mixture ($P^{FH}_{OH-OH}$) may be submitted to work-up procedures at the end of Step (1), including, for instance, removal of solvent, removal of possible undesired side-products, etc.

In particular, according to certain embodiments, compounds of formula (I) of mixture ($P^{FH}_{OH-OH}$) may be separated from compounds of formula (II), such separation being achieved through well-known separation technologies, including distillation/fractionation, absorption/elution, and the like.

It is nevertheless understood that embodiments wherein compounds of formula (II) are not separated and removed from mixture ($P^{FH}_{OH-OH}$) are not detrimentally affecting further reactivity in subsequent steps.

In Step (2), mixture ($P^{FH}_{OH-OH}$) is reacted with COF$_2$. Generally, reaction conditions are adapted to enable a gaseous amount of COF$_2$ to contact mixture ($P^{FH}_{OH-OH}$). Reaction may be carried out substantially under atmospheric pressure or slight overpressure, by bubbling a gaseous flow of COF$_2$ through a reaction medium comprising mixture ($P^{FH}_{OH-OH}$) and enabling excess COF$_2$ to escape the reaction medium. According to other embodiments, reaction may be carried out under pressure, feeding in a closed reactor a given amount of COF2, and maintaining overpressure until completion of Step (2).

Carbonyl fluoride may be generated 'on-line', and/or prior to be used, by reaction of carbon monoxide with molecular fluorine.

Step (2) may be carried out in the presence of a solvent. When a solvent is used, it is generally preferred to employ a per(halo)fluorinated solvent, which is stable under fluorination conditions.

Examples thereof are notably per(halo)fluorocarbon compounds, possibly comprising heteroatoms such as O, S, and N; a particularly effective solvent is 1,2,3,4-tetrachlorohexafluorobutane.

Preferably, step (2) is performed at moderated temperature, that is to say, at temperatures of no more than 80° C., preferably no more than 70° C., even more preferably no more than 50° C. Effectiveness of conversion of hydroxyl groups into fluoroformate groups is already achieved when operating at temperatures of below 35° C.; generally temperatures exceeding 0° C., preferably exceeding 5° C., more preferably exceeding 10° C. will be preferred.

As said, Step (2) leads to a mixture ($P^{FH}_{OC(O)F-OC(O)F}$) comprising a major amount of any di-fluoroformate compounds of formula (III): F—C(O)—O—CH$_2$—RH—[CH$_2$—O—CF$_2$CHF—(CR$_f^1$R$_f^2$)$_a$—O—R$_f$—O—(CR$_f^1$R$_f^2$)$_b$—CFHCF$_2$—O—Ch$_2$—R$_H$—]$_n$—Ch$_2$—O—C(O)—F; and possibly comprising a minor amount of a compound of formula (II), as above detailed, which actually is not modified/not reacted in said Step (2).

Conversion of compounds of formula (I) into compounds of formula (III) can be monitored by suitable analytical techniques.

Substantially all hydroxyl groups of compounds of formula (I), as above detailed, are converted into fluoroformate groups: in other terms, mixture ($P^{FH}_{OC(O)F-OC(O)F}$) comprises no detectable amount of any compounds of formula (I), as detailed above, nor of any hydroxyl-fluoroformate compounds of formula (VIII): HO—CH$_2$—RH—[CH$_2$—O—CF$_2$CHF—(CR$_f^1$R$_f^2$)$_a$—O—R$_f$—O—(CR$_f^1$R$_f^2$)$_b$—CFHCF$_2$—O—CH$_2$—R$_H$—]$_{n*}$—CH$_2$—O—C(O)—F, wherein R$_H$, R$_f$, R$_f^1$, R$_f^2$, a and b have the meaning defined above, and n* is such that the number averaged molecular weight of compounds (VIII) is of 300 to 50 000, preferably of 400 to 40 000, more preferably of 500 to 25 000.

In compound (III), all the preferences set forth for groups R$_H$, R$_f$, R$_f^1$, R$_f^2$, a and b in connection with compounds (F) and compounds (H) are applicable here mutatis mutandis.

Generally, mixture ($P^{FH}_{OC(P)F-OC(O)F}$) essentially consists of compounds of formula (III) and optionally (II) as detailed above, that is to say that no significant other component can be detected in said mixture.

Advantageously, mixture ($P^{FH}_{OC(O)F-OC(O)F}$) comprises an amount of any compounds of formula (III) of at least 75, preferably at least 80, more preferably at least 85% moles, with respect to the total moles of compounds of formula (I) and formula (II).

Conversely, mixture ($P^{FH}_{OC(o)F-OC(O)F}$) comprises an amount of any compounds of formula (III) of 100, preferably at most 99, more preferably at most 98% moles, with respect to the total moles of compounds of formula (III) and formula (II).

In Step (3), mixture ($P^{FH}_{OC(O)F-OC(O)F}$) is contacted with a source of molecular fluorine to effect fluorination. Under fluorination conditions, fluoroformate groups advantageously do not undergo any significant decomposition/side-reaction, while essentially exhaustive fluorination is achieved for C—H bonds, which are transformed into C—F bonds.

The choice of the source of molecular fluorine is not critical. Preferably, said source of molecular fluorine is a gas containing fluorine. While embodiments whereas the said source of molecular fluorine is neat fluorine gas ($F_2$) are foreseen, it is generally understood that techniques whereas use is made of a diluted gaseous mixture of fluorine and an inert gas can be equally practiced, and may have advantages.

Fluorine gas may be admixed with nitrogen, argon, helium.

Advantageously, according to certain embodiments, a halogenated olefin can be added in order to generate fluorine radicals to assist the fluorination step (2). Said halogenated olefin can be selected for example from tetrafluoroethylene (TFE), hexafluoro-propylene (HFP), octafluorobutene, perfluoropentene, perfluorohexene, perfluoroheptene, perfluoroctene, perfluorocyclobutene, perfluorocyclopentene, perfluorocyclohexene, chlorotrifluoroethylene (CTFE), dichlorodifluoroethylene, chloropentafluoropropene, perfluorobuta-diene, perfluoro-methylvinylether, perfluoro-ethylvinylether, perfluoro-propylvinylether; $CF_3OCIC=CCIF$, trichloroethylene, tetrachloroethylene, dichloroethylene isomers; and fluorodioxoles.

Preferably, step (3) is performed under heating, such as for example at a temperature of from 25° C. to 80° C., preferably from 30° C. to 75° C.

In compound (IV), all the preferences set forth for groups $R_f$, $R_f^1$, $R_f^2$, a and b in connection with compounds (F) are applicable here mutatis mutandis.

To the extent group $R_F$ is concerned, this group is actually the perfluorinated moiety corresponding to group $R_H$. Hence, $R_F$ is a bond or a $C_1$-$C_{18}$ perfluorocarbon group, possibly comprising one or more than one ethereal oxygen, preferably $R_F$ is a bond or a $C_1$-$C_{18}$ perfluoro(oxy)alkylene chain; said perfluoroalkylene chain may be linear or branched, with linear structures being preferred.

Generally, mixture ($P^{FF}_{OC(O)F-OC(O)F}$) essentially consists of any compounds of formula (IV) and optionally (V) as detailed above, that is to say that no significant other component can be detected in said mixture.

In formulae (IV) and (V), all the preferences set forth for groups $R_F$, $R_f$, $R_f^1$, $R_f^2$, a and b are applicable here mutatis mutandis.

Advantageously, mixture ($P^{FF}_{OC(O)F-OC(O)F}$) comprises an amount of any compounds of formula (IV) of at least 75, preferably at least 80, more preferably at least 85% moles, with respect to the total moles of compounds of formula (IV) and formula (V).

Conversely, mixture ($P^{FH}_{OC(O)F-OC(O)F}$) comprises an amount of any compounds of formula (IV) of 100, preferably at most 99, more preferably at most 98% moles, with respect to the total moles of compounds of formula (IV) and formula (V).

In Step (4), mixture ($P^{FF}_{OC(O)F-OC(O)F}$) is submitted to hydrolysis conditions in the presence of water. While liquid water may be added to mixture ($P^{FF}_{OC(O)F-OC(O)F}$) for effecting hydrolysis of fluoroformate groups, it is generally understood that a flow of moisturized gas, e.g. moisturized air, with relative humidity (RH) of at least 50%, could be an effective vehicle for contacting mixture ($P^{FF}_{OC(O)F-OC(O)F}$) with water.

In Step (4), upon exposure to water, compounds of formula (IV) possessing fluoroformate end groups are advantageously decomposed through decarboxylation and dehydrofluorination, and are transformed into carboxylic acid-derivatives, hence "losing" a carbon atom per fluoroformate group.

Conversion of fluoroformate end groups is substantially quantitative, and progress of the reaction can be monitored through appropriate analytical technique.

Result of Step (4) is hence a mixture ($P^{FF}_{COOH-COOH}$) comprising a major amount of a perfluorinated di-carboxylic acid compound of formula (VII): HOOC—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F]_{n'''}$—COOH, and possibly comprising a minor amount of a compound of formula (V), as detailed above.

Generally, mixture ($P^{FF}_{COOH-COOH}$) essentially consists of any compounds of formula (VII) and optionally (V) as detailed above, that is to say that no significant other component can be detected in said mixture.

In formulae (VII) and (V), all the preferences set forth for groups $R_F$, $R_f$, $R_f^1$, $R_f^2$, a and b are applicable here mutatis mutandis.

Advantageously, mixture ($P^{FF}_{COOH-COOH}$) comprises an amount of any compounds of formula (VII) of at least 75, preferably at least 80, more preferably at least 85% moles, with respect to the total moles of compounds of formula (VII) and formula (V).

Conversely, mixture ($P^{FF}_{COOH-COOH}$) comprises an amount of any compounds of formula (VII) of 100, preferably at most 99, more preferably at most 98% moles, with respect to the total moles of compounds of formula (VII) and formula (V).

In Step (5), said mixture ($P^{FF}_{COOH-COOH}$) is fluorinated by contacting with a source of molecular fluorine. Same considerations already formulated in connection with the source of fluorine as used in Step (3) are applicable here.

As said, in Step (5), the stoichiometrically required amount of fluorine to convert the targeted fraction of —COOH end groups to generate the mixture ($P^{FF}_{COOH-CF3}$), as detailed above, is added.

Actually, as in mixture ($P^{FF}_{COOH-COOH}$) solely carboxylic acid groups are reactive towards fluorination, through decarboxylation and formation of a non-reactive perfluorinated group, the relative amount of carboxylic acid and perfluorinated chain ends can be easily targeted by adjusting the amount of molecular fluorine used in said Step (5).

As a consequence, the amount of molecular fluorine used in Step (5) may be adjusted for generating a mixture ($P^{FF}_{COOH-CF3}$) comprising any of compounds of formulae:

formula (VII) HOOC—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F]_{n'''}$—COOH;

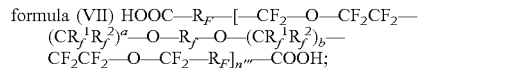

formula (IX)

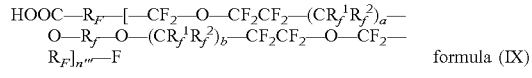

formula (X)

and possibly comprising a minor amount of any compounds of formula (V), wherein in formulae (VII), (IX), (X) and (V) $R_F$, $R_f$, $R_f^1$, $R_f^2$, n''', a and b have the meaning defined above.

In particular, the amount of molecular fluorine used in Step (5) may be adjusted for generating a mixture ($P^{FF}_{COOH-CF3}$) comprising a major amount of any compounds of formula (IX):

HOOC—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F]_{n'''}$—F, as above detailed. In other terms, conditions may be adapted to obtain a mixture ($P^{FF}_{COOH-CF3}$) comprising any of compounds of formulae (VII), (IX), (X) and (V), as detailed above, wherein the molar ratio between the overall amount of end groups of formula —COOH and of formula —$CX_F^1X_F^2F$, with $X_F^1$ and $X_F^2$ being F or a $C_1$-$C_3$ perfluoroalkyl group is comprised between 35:65 to 65:35, preferably between 40:60 to 60:40, most preferably 45:55 to 55:45.

The method of the invention may further include additional steps for isolating, separating, purifying components of mixture ($P^{FF}_{COOH-CF3}$), according to standard techniques known in the art.

In particular, the method of the invention may include a separation step applied to mixture ($P^{FF}_{COOH-CF3}$), which may be based on known techniques including notably fractionation, molecular distillation, adsorption on inert support, which will provide for a mixture ($P^{FF}_{COOH-CF3}{}^{MONO}$), in which the relative amount of any compounds of formula (IX): HOOC—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F]_{n'''}$—F, as above detailed, with respect to all other components of the mixture)($P^{FF}_{COOH-CF3}{}^{MONO}$) has been increased with respect to the relative amount of the said component in mixture ($P^{FF}_{COOH-CF3}$). This separation step is particularly effective when applied to mixtures ($P^{FF}_{COOH-CH3}$) already comprising a major amount of any compounds of formula (IX), for isolating a mixture ($P^{FF}_{COOH-CF3}{}^{MONO}$) wherein the amount of any compounds of formula (IX) may be raised up to 80% moles, preferably at least 85% moles, more preferably at least 90% moles, and even beyond, with respect to the total moles of compounds of mixture ($P^{FF}_{COOH-CF3}{}^{MONO}$).

Further, the method of the invention may include additional steps aimed at exploiting reactivity of —COOH end groups of compounds of mixture ($P^{FF}_{COOH-CF3}$). Notably, the said —COOH end groups may be salified and/or esterified to provide groups of formula —$COOR_a$, with $R_a$ being a monovalent metal; a group of formula $NR^N_4$, with $R^N$ being H or a $C_1$-$C_{12}$ hydrocarbon group; or a $C_1$-$C_{12}$ hydrocarbon group. Alternatively, said —COOH end groups may be transformed into corresponding acyl halides groups of formula —COX, with X being F, Cl.

Whichever type of chemistry may be further applied to those reactive carboxylic, carboxyl-derivative or carbonyl halide groups; in particular, said groups may be reacted with different reactants, e.g. as described in U.S. Pat. No. 3,810,874 (MINNESOTA MINING AND MANUFACTURING COMPANY) 14 May 1974.

Hence, for instance, any compounds HOOC—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F]_{n'''}$—F of formula (IX) of mixture ($P^{FF}_{COOH-CF3}$), as above detailed, can be modified into a compound of formula A—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F]_{n'''}$—F, wherein $R_F$, $R_f$ $R_f^1$, $R_f^2$, n''', a and b have the meaning defined above, and A is a group of formula —$X_aYZ_b$, wherein:

X a polyvalent, preferably divalent, linking organic radical, preferably selected from the group consisting of —CONR—, —COO—, —COS—, —CO—, and groups of any of formulae:

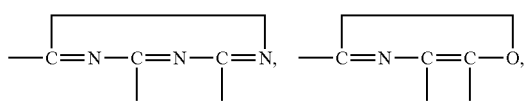

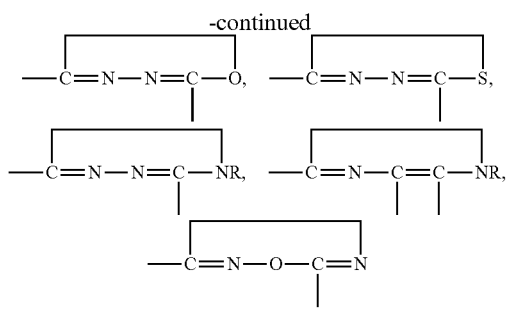

a is zero or one;
b is an integer of 1-3;
R is hydrogen, (e.g., $CH_3$, —$CH_2CF_3$, —$C_6H_{13}$), aryl of less than 13 carbon atoms (e.g., —$C_6H_5$, —$C_6H_4CH_3$) or —$YZ_b$ radical;
Y is a bond or a polyvalent linking organic radicals free of olefinic unsaturation such as alkylene (e.g., —$CH_2$—, —$C_2$—, $C_2H_4$—), oxa-alkylene (e.g., —$CH_2OCH_2$—) cycloalkylene (e.g. —c—$C_6H_{10}$—), thia-alkylene (e.g., —$CH_2SCH_2$—) arylene (e.g. —$C_6H_4$—,), or combinations thereof, such as aralkylene and alkarylene;
Z is a functional groups which may notably undergo electrophilic, nucleophilic, or free radical reaction, and which can be notably selected from the group consisting of —OH, —SH, —SR', —$NR_2'$, —$CO_2H$, —$SiR'_dQ_{3-d}$, —CN, —NCO, >C=C<, —$C_2R'$, —$OSO_2CF_3$, —OCOCl, —OCN, —N(R')CN, —(O)COC(C)—, —N=C, —I, —CHO, —$CH(OCH_3)_2$, —$SO_2Cl$, —$C(OCH_3)$=NH, —$C(NH_2)$=NH, —$C_6H_4OC_6H_4$—Q, —$OCR_1R_2R_f$,

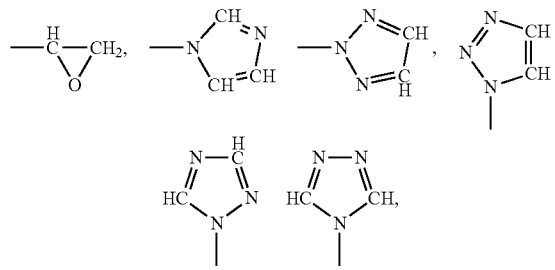

wherein R' is hydrogen, aryl, or a $C_1$-$C_6$ alkyl; Q is halogen, —OR', —OCOR', or —CH=$CH_2$; and d is or an integer of 1 to 3; $R_1$ is hydrogen, or a $C_1$-$C_6$ (fluoro)alkyl, $R_2$ is hydrogen, or a $C_1$-$C_6$ alkyl; and $R_f$ is a $C_1$-$C_6$ (fluoro)alkyl.

Should the disclosure of any patents, patent applications, and publications which are incorporated herein by reference conflict with the description of the present application to the extent that it may render a term unclear, the present description shall take precedence.

The invention will be now described in connection with the following examples, whose purpose is merely illustrative and not intended to limit the scope of the invention.

EXPERIMENTAL SECTION

Example 1

Step 1 a) Synthesis of $HO(CH_2)_4[OCF_2CFHO(CF_2)_3OCFHCF_2O(CH2)_4]_nOH$

A three neck round bottom flask with magnetic stirring, temperature probe and reflux condenser was charged with 9.73 g of NaOH, 37.60 g of 1,4-butanediol and 240 ml of acetonitrile. The mixture was heated at 40° C. under stirring till complete dissolution of sodium hydroxide. Then 120.48 g of $CF_2$=$CF$—$O(CF_2)_3O$—$CF$=$CF_2$ were added dropwise. The resulting mixture was held at 40° C. under stirring for 8 hours and then heated up at 60° C. for 2 hours, till complete conversion of perfluoro-bis-vinylether compound. Acetonitrile was evaporated at 60° C. under reduced pressure and the crude residue was extracted with 120 ml of water and 120 ml of $CH_2Cl_2$; the aqueous phase was extracted again with 100 ml of fresh $CH_2Cl_2$ and the two organic phases were collected and extracted with brine (100 ml). The organic phase was separated, treated with anhydrous $Na_2SO_4$, and filtered; the filtrate was recovered and solvent was evaporated under reduced pressure to obtain 144 g of a mixture containing: 5.2% mol. of a cyclic ether as side product obtained from the intramolecular reaction between the hydroxy group and the vinyl group in the product of formula $HO(CH_2)_4O$—$CF_2CFHO(CF_2)_3OCF$=$CF_2$, that is to say compound of formula:

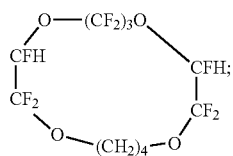

and 94.8% mol. of a polymer with formula $HO(CH_2)_4$ $[OCF_2CFHO(CF_2)_3OCFHCF_2O(CH_2)_4]_nOH$, with n being such that the number average molecular weight (as determined by NMR) was about 2030.

Step 1b): Protection of Hydroxyl Groups as Fluoroformate Groups 52.4 g of the polymer mixture obtained in step (a) were diluted in 280 g of 1,2,3,4-tetrachlorohexafluorobutane and loaded into a 500 ml stainless steel reactor equipped with a mechanical stirrer, two inlet pipes, a thermocouple and an outlet pipe, enabling overflow of gases to be vented out. While keeping the reactor at 20° C. and under vigorous stirring, 3.0 Nl/h of carbonyl fluoride (obtained by reaction between 3.0 Nl/h of elemental fluoride and 4.0 Nl/h of carbon monoxide) was fed to the reactor. This feed of carbonyl fluoride was pursued for a duration of 2 h 30 m. After this reaction time, all —$CH_2OH$ terminal groups of the polymer were found to be converted into corresponding —$CH_2OC(O)F$ fluoroformate terminal groups. At this stage, hence, the reaction mixture comprised a major amount of compound of formula: F—$C(O)O(CH_2)_4$ $[OCF_2CFHO(CF_2)_3OCFHCF_2O(CH_2)_4]_nO$—$C(O)$—F, with n being such that the number average molecular weight (as determined by NMR) was about 2030.

Step 1c): Fluorination of Fluoroformate Derivative and Hydrolysis Thereof to Carboxylic Acid Perrfluoro-Derivative The reaction mixture obtained from Step 1b) was used as such, and maintained in the same stainless steel reactor. The temperature in such reactor was risen to 40° C. and diluted elemental fluorine (25% vol/vol in helium) was fed to the reactor and its conversion was monitored by gas chromatography analysis. When fluorine conversion dropped down below 60%, carbon monoxide (16% vol/vol in helium) was fed to the reactor by the second inlet pipe to achieve the complete conversion of all residual hydrogen atoms (the molar ratio $F_2$:CO was about 15:1).

At the end of the fluorination (checked and confirmed by $^1$H-NMR analysis on a small sample of the solution), hence, the reaction mixture comprised a major amount of compound of formula: F—$C(O)O(CF_2)_4$—$[OCF_2CF_2O$ $(CF_2)_3OCF_2CF_2O(CF_2)_4]_nO$—$C(O)$—F, with n being such that the number average molecular weight (as determined by NMR) was about 2030.

The residual fluorine was vented away by inert gas, the crude mixture was discharged in a PFA round bottom flask and kept under vigorous stirring while feeding humid air by an inlet pipe. After 8 h, the $^{19}$F-NMR analysis confirmed the complete conversion of all the precedent —$CF_2CF_2CO(O)F$ perfluoroformate terminal groups into the corresponding —$CF_2C(O)OH$ carboxylic terminal groups, whose amount was quantitatively determined by $^{19}$F-NMR with 1,2,3,4-tetrachlorohexafluorobutane as internal standard.

Reaction mixture at this stage contained a major amount of compound of formula:
HOOC—$(CF_2)_3$—$[OCF_2CF_2O(CF_2)_3OCF_2CF_2O$ $(CF_2)_4]_{n-1}O$—$CF_2CF_2O(CF_2)_3OCF_2CF_2O(CF_2)_3$—COOH, with n being such that the number average molecular weight (as determined by NMR) was about 2030.

Step 1d) Selective Fluorination of Carboxylic End Groups to Pprovide —$CF_3$ End Groups and Successive Esterification With Eethanol The difunctional carboxylic polymer obtained in step 1 c), still dissolved in 1,2,3,4-tetrachlorohexafluorobutane, was loaded into a 500 ml stainless steel reactor equipped with a mechanical stirrer, two inlet pipes, a thermocouple and an outlet pipe. While keeping the reactor at 20° C., diluted elemental fluorine (8.5% vol/vol in helium) was fed to the reactor in such an amount to convert half of —$CF_2COOH$ terminal groups into the corresponding —$CF_3$ neutral terminal groups (conversion confirmed by $^{19}$F-NMR analysis). The raw mixture was discharged in a PFA round bottom flask (equipped with a condenser) and treated with excess ethanol (EtOH) at 100° C. to convert all the carboxylic groups into the corresponding —$CF_2C(O)OCH_2CH_3$ ethyl ester. The solution was then washed twice with water to remove excess EtOH and HF and then the solvent was distilled away obtaining—as residue—61.3 g of an oily product whose $^{19}$F and $^1$H-NMR analysis confirmed a structure possessing as backbone a sequence of recurring units of formula —$(CF_2CF_2CF_2CF_2O$— $CF_2CF_2OCF_2CF_2CF_2OCF_2CF_2O)$ group, and as end-groups, a mixture of groups of formula: —$OCF_2CF_2CF_3$ and —$OCF_2CF_2CF_2C(O)OCH_2CH2$ in the molar ratio of about 48:52, and a number averaged molecular weight of about 2910.

The invention claimed is:
1. A method for manufacturing a mixture of polymers [mixture ($P^{FF}_{COOH-CF3}$)], said mixture ($P^{FF}_{COOH-CF3}$) comprising polymers possessing a backbone consisting of a sequence of recurring units of formula —O—$CF_2$—$R_F$— $CF_2$—O—$CF_2CF_2$—$(CR_f^1R_f^2)_a$—O—$R_f$—O— $(CR_f^1R_f^2)_b$—$CF_2CF_2$—,
wherein:
$R_f$ is a $C_1$-$C_{18}$ perfluorocarbon group, possibly comprising one or more than one ethereal oxygen;
$R_F$ is a bond or a $C_1$-$C_{18}$ perfluorocarbon group, possibly comprising one or more than one ethereal oxygen;

each of $R_f^1$ and $R_f^2$, equal to or different from each other, is F or a $C_1$-$C_6$ perfluorocarbon group;

a and b being independently zero or 1 and being collectively zero or 1;

and said polymers having chain ends selected from the group consisting of —COOH and —$CX_F^1X_F^2$F, with $X_F^1$ and $X_F^2$ being F or a $C_1$-$C_3$ perfluoroalkyl group;

said process comprising:

Step (1): a step of reacting:

(1a) at least one perfluoro compound [compound (F)] of formula $CF_2=CF-(CR_f^1\ R_f^2)\ a\ -O-R_f-O-(CR_f^1R_f^2)_b-CF=CF_2$, wherein $R_f$, $R_f^1$, $R_f^2$, a and b have the meaning defined above; and (1b) at least one hydrogen-containing compound [compound (H)] of formula: HO—$CH_2$—$R_H$—$CH_2$—OH, with $R_H$ being a bond or a $C_1$-$C_{18}$ (fluoro)hydrocarbon group, optionally comprising one or more than one ethereal oxygen, in molar ratio compound (H):compound (F) of exceeding 1:1, so as to generate a mixture ($P^{FH}_{OH-OH}$) comprising a major amount of any di-hydroxy compounds of formula (I):

HO—$CH_2$—RH—[$CH_2$—O—$CF_2CHF$—$(CR_f^1R_f^2)_a$—O—$R_f$—O—$(CR_f^1R_f^2)_b$—$CFHCF_2$—O—$CH_2$—$R_H$—]$_n$—$CH_2$—OH; and optionally comprising a minor amount of any compounds of formula (II):

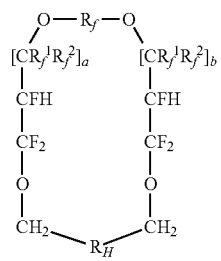

wherein in formulae (I) and (II) $R_H$, $R_f$, $R_f^1$, $R_f^2$, a and b have the meaning defined above, and n is such that the number averaged molecular weight of compounds (I) is of 300 to 50 000;

Step (2): a step of reacting mixture ($P^{FH}_{OH-OH}$) with $COF_2$, so as to generate a mixture ($P^{FH}_{OC(O)F-OC(O)F}$) comprising a major amount of any di-fluoroformate compounds of formula (III):

F—C(O)—O—$CH_2$—$R_H$—[$CH_2$—O—$CF_2CHF$—$(CR_f^1R_f^2)_a$—O—$R_f$—O—$(CR_f^1R_f^2)_b$—$CFHCF_2$—O—$CH_2$—$R_H$—]$_{n'}$—$CH_2$—O—C(O)—F; and optionally comprising a minor amount of a compound of formula (II), as above detailed, wherein, in formula (III), $R_H$, $R_f$, $R_f^1$, $R_f^2$, a and b have the meaning defined above, and n' is such that the number averaged molecular weight of compounds (I) is of 300 to 50 000;

Step (3): a step of fluorinating mixture ($P^{FH}_{OC(O)F-OC(O)F}$) with a source of molecular fluorine, so as to generate a mixture ($P^{FF}_{OC(O)F-OC(O)F}$) comprising a major amount of a perfluorinated di-fluoroformate compound of formula (IV):

F—C(O)—O—$CF_2$—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F$—]$_{n''}$—$CF_2$O—C(O)—F, and optionally comprising a minor amount of a compound of formula (V):

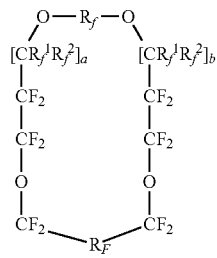

wherein in formulae (IV) and (V) $R_F$, $R_f$, $R_f^1$, $R_f^2$, a and b have the meaning defined above; and n'' is such that the number averaged molecular weight of compounds (I) is of 300 to 50 000;

Step (4): a step of hydrolysing mixture ($P^{FF}_{OC(O)F-OC(O)F}$) in the presence of water, so as to generate a mixture ($P^{FF}_{COOH-COOH}$) comprising a major amount of a perfluorinated di-carboxylic acid compound of formula (VII):

HOOC—$R_F$—[—$CF_2$—O—$CF_2CF_2$—$(CR_f^1R_f^2)_a$—O—$R_f$—O—$(CR_f^1R_f^2)_b$—$CF_2CF_2$—O—$CF_2$—$R_F$]$_{n'''}$—COOH, and optionally comprising a minor amount of a compound of formula (V), as detailed above, wherein in formula (VII) $R_F$, $R_f$, $R_f^1$, $R_f^2$, a and b have the meaning defined above, and n''' is such that the number averaged molecular weight of compounds (I) is of 300 to 50 000;

Step (5): a step of fluorinating mixture ($P^{FF}_{COOH-COOH}$), by contacting with a source of molecular fluorine, wherein the required amount of fluorine to convert the targeted fraction of —COOH end groups to generate the mixture ($P^{FF}_{COOH-COOH}$), as detailed above, is added.

2. The method of claim 1, wherein the compound (F) used in Step (1) is represented by the following formula:

$CF_2=CF(CF_2)_aOR_fO(CF_2)_bCF=CF_2$.

3. The method of claim 1, wherein compound (H) is represented by the following formula:

formula: HO—$CH_2$—RH—$CH_2$—OH, with $R_H$ being a bond or a $C_1$-$C_{18}$ (fluoro)hydrocarbon group, optionally comprising one or more than one ethereal oxygen.

4. The method of anyone of claim 1, wherein mixture ($P^{FH}_{OH-OH}$) comprises a major amount of a di-hydroxy compound of formula (I):

HO—$CH_2$—RH—[$CH_2$—O—$CF_2CHF$—$(CR_f^1R_f^2)_a$—O—$R_f$—O—$(CR_f^1R_f^2)_b$—$CFHCF_2$—O—$CH_2$—$R_H$—]$_n$—$CH_2$—OH; and optionally comprises a minor amount of a compound of formula (II):

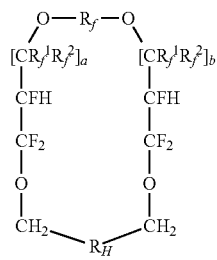

wherein in formulae (I) and (II) $R_H$, $R_f$, $R_f^1$, $R_f^2$, a and b have the meaning defined in claim 1.

5. The method according to claim 1, wherein in Step (2), mixture ($P^{FH}_{PH—OH}$) is reacted with $COF_2$ by bubbling a gaseous flow of $COF_2$ through a reaction medium comprising mixture ($P^{FH}_{OH—OH}$) and enabling excess $COF_2$ to escape the reaction medium.

6. The method according to claim 1, wherein Step (2) leads to a mixture ($P^{FH}_{OC(O)F—OC(O)F}$) comprising a major amount of any di-fluoroformate compounds of formula (III):

F—C(O)—O—$CH_2$—$R_H$—[$CH_2$—O—$CF_2$CHF—($CR_f^1R_f^2$)$_a$—O—($CR_f^1R_f^2$)$_b$—CFHCF$_2$—O—$CH_2$—$R_H$—]$_{n'}$—$CH_2$—O—C(O)—F; and optionally comprising a minor amount of a compound of formula (II), as above detailed, which is not modified/not reacted in said Step (2), and wherein substantially all hydroxyl groups of compounds of formula (I) are converted into fluoroformate groups.

7. The method according to claim 1, wherein mixture ($P^{FH}_{OC(O)F—OC(O)F}$) consists essentially of compounds of formula (III) and optionally (II), wherein formula (III) is as follows:

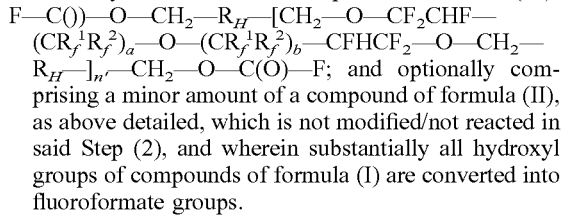

8. The method according to claim 1, wherein in Step (3), mixture ($P^{FH}_{OC(O)F—OC(O)F}$) is contacted with a source of molecular fluorine selected from gases containing fluorine, and wherein a halogenated olefin is added.

9. The method according to claim 1, wherein mixture ($P^{FF}_{OC(O)F—OC(O)F}$) consists essentially of any compounds of formula (IV) and optionally (V).

10. The method according to claim 1, wherein in Step (4), mixture ($P^{FF}_{OC(O)F—OC(O)F}$) is submitted to hydrolysis conditions in the presence of water, resulting in a mixture ($P^{FF}_{COOH—COOH}$) comprising a major amount of a perfluorinated di-carboxylic acid compound of formula (VII):

HOOC—$R_F$—[—$CF_2$—O—$CF_2CF_2$—($CR_f^1R_f^2$)$_a$—O—$R_f$—O—($CR_f^1R_f^2$)$_b$—$CF_2CF_2$—O—$CF_2$—$R_F$]$_{n'''}$—COOH, and possibly comprising a minor amount of a compound of formula (V).

11. The method according to claim 1, wherein in Step (5), the amount of molecular fluorine used in Step (5) is adjusted for generating a mixture ($P^{FF}_{COOH—CF3}$) comprising any of compounds of formulae:

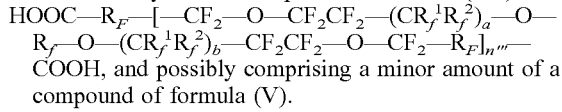

and optionally comprising a minor amount of any compounds of formula (V), wherein in formulae (VII), (IX), (X) and (V).

12. The method of claim 11, wherein conditions in Step (5) are adapted to obtain a mixture ($P^{FF}_{COOH—CF3}$) comprising any of compounds of formulae (VII), (IX), (X) and (V), wherein the molar ratio between the overall amount of end groups of formula —COOH and of formula —$CX_F^1X_F^2$F, with $X_F^1$ and $X_F^2$ being F or a $C_1$-$C_3$ perfluoroalkyl group, is between 35:65 to 65:35 and wherein formula (IX) is as follows:

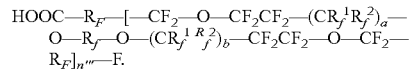

13. The method according to claim 1, comprising an additional step wherein the —COOH end groups of compounds of mixture ($P^{FF}_{COOH—CF3}$) are salified and/or esterified to provide end groups of formula —COOR$_a$, with R$_a$ being a monovalent metal; a group of formula NR$^N_4$, with R$^N$ being H or a $C_1$-$C_{12}$ hydrocarbon group; or a $C_1$-$C_{12}$ hydrocarbon group.

14. The method according to claim 11, wherein any compounds of formula (IX) HOOC—$R_F$—[—$CF_2$—O—$CF_2CF_2$—($CR_f^1R_f^2$)$_a$—O—$R_f$—O—($CR_f^1R_f^2$)$_b$—$CF_2CF_2$—O—$CF_2$—$R_F$]$_{n'''}$—F of mixture ($P^{FF}_{COOH—CF3}$) is modified into a compound of formula A—$R_F$—[—$CF_2$—O—$CF_2CF_2$—($CR_f^1R_f^2$)$_a$—O—$R_f$—O—($CR_f^1R_f^2$)$_b$—$CF_2CF_2$—O—$CF_2$—$R_F$]$_{n'''}$—F, wherein $R_F$, $R_f$, $R_f^1$, $R_f^2$, n''', a and b have the meaning defined above, and A is a group of formula —$X_aYZ_b$, wherein:

X a polyvalent, selected from the group consisting of —CONR—, —COO—, —COS—, —CO—, and groups of any of formulae:

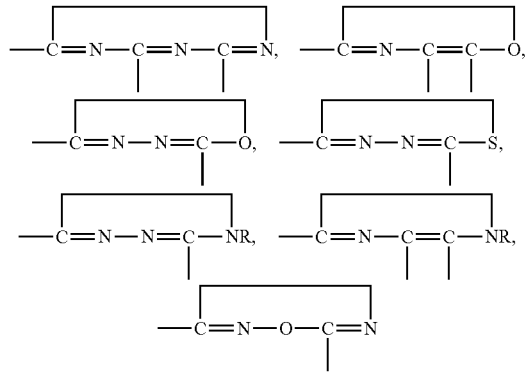

a is zero or one;
b is an integer of 1-3;
R is hydrogen, aryl of less than 13 carbon atoms or —$YZ_b$ radical;
Y is a bond or a polyvalent linking organic radicals free of olefinic unsaturation such as alkylene (e.g., —$CH_2$—, —$C_2H_4$—), oxa-alkylene (e.g., —$CH_2OCH_2$—), cycloalkylene, thia-alkylene, arylene, or combinations thereof, such as aralkylene and alkarylene;
Z is a functional groups which can undergo electrophilic, nucleophilic, or free radical reaction, and which are optionally selected from the group consisting of —OH, —SH, —SR', —NR$_2$', —CO$_2$H, —SiR'$_d$Q$_{3-d}$, —CN, —NCO, >C=C<, —CO$_2$R', —OSO$_2$CF$_3$, —OCOCl, —OCN, —N(R')CN, —(O)COC(O)—, —N=C, —I, —CHO, —CH(OCH$_3$)$_2$, —SO$_2$Cl, —C(OCH$_3$)=NH, —C(NH$_2$)=NH, —C$_6$H$_4$OC$_6$H$_4$—Q, —OCR$_1$R$_2$R$_f$,

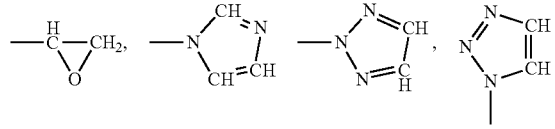

-continued
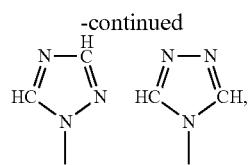
wherein R' is hydrogen, aryl, or a $C_1$-$C_6$ alkyl; Q is halogen, —OR', —OCOR', or —CH=$CH_2$; and d is or an integer of 1 to 3; $R_1$ is hydrogen, or a $C_1$-$C_6$ (fluoro)alkyl, $R_2$ is hydrogen, or a $C_1$-$C_6$ alkyl; and $R_f$ is a $C_1$-$C_6$ (fluoro)alkyl.
* * * * *